United States Patent
Akaike et al.

(10) Patent No.: US 10,059,236 B2
(45) Date of Patent: Aug. 28, 2018

(54) RECLINER ATTACHMENT BRACKET

(71) Applicant: TOYOTA BOSHOKU KABUSHIKI KAISHA, Aichi-ken (JP)

(72) Inventors: Fumitoshi Akaike, Aichi-ken (JP); Hiroyuki Suzuki, Aichi-Ken (JP); Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 142 days.

(21) Appl. No.: 15/161,430

(22) Filed: May 23, 2016

(65) Prior Publication Data
US 2016/0347223 A1    Dec. 1, 2016

(30) Foreign Application Priority Data

May 25, 2015 (JP) ................. 2015-105502

(51) Int. Cl.
| | |
|---|---|
| *B60N 2/22* | (2006.01) |
| *B60N 2/23* | (2006.01) |
| *B60N 2/68* | (2006.01) |
| *B60N 2/20* | (2006.01) |
| *B60N 2/235* | (2006.01) |

(52) U.S. Cl.
CPC ............ *B60N 2/682* (2013.01); *B60N 2/20* (2013.01); *B60N 2/22* (2013.01); *B60N 2/2356* (2013.01); *B60N 2/688* (2013.01); *B60N 2002/684* (2013.01)

(58) Field of Classification Search
CPC . B60N 2/22; B60N 2/68; B60N 2/682; B60N 2/2352; B60N 2/2356; B60N 2002/684
See application file for complete search history.

(56) References Cited

U.S. PATENT DOCUMENTS

| | | | | |
|---|---|---|---|---|
| 5,564,785 | A * | 10/1996 | Schultz ................ | B60N 2/58 297/367 R |
| 6,375,267 | B1 * | 4/2002 | Ishikawa ............ | B60N 2/68 297/452.18 |
| 8,888,191 | B2 | 11/2014 | Hosokawa | |
| 2007/0210638 | A1 * | 9/2007 | Adragna ............ | B60N 2/68 297/452.2 |
| 2008/0277993 | A1 * | 11/2008 | Blankart ............ | B60N 2/682 297/452.18 |
| 2011/0156462 | A1 * | 6/2011 | Lim ................... | B60N 2/20 297/354.12 |

(Continued)

FOREIGN PATENT DOCUMENTS

| | | | | |
|---|---|---|---|---|
| JP | 4055182 B2 * | 3/2008 | ............ | B60N 2/22 |
| JP | 2013-193586 | 9/2013 | | |
| JP | 2015003631 A * | 1/2015 | ............ | B60N 2/682 |

*Primary Examiner* — Ryan D Kwiecinski
(74) *Attorney, Agent, or Firm* — Greenblum & Bernstein, P.L.C.

(57) ABSTRACT

A recliner attachment bracket includes a closed-section structural material having a recliner attachment portion. The recliner attachment portion is configured such that surfaces of two plate materials are joined to each other by pressing a central part of the closed-section structural material while hollow closed-section structures are left on both sides of the closed-section structural material. A lower end of the recliner attachment portion is constituted by only one of the plate materials.

4 Claims, 14 Drawing Sheets

(56) References Cited

U.S. PATENT DOCUMENTS

| | | | | |
|---|---|---|---|---|
| 2013/0140868 A1* | 6/2013 | Muck | ............... | B23K 26/24 |
| | | | | 297/452.2 |
| 2013/0249267 A1* | 9/2013 | Hosokawa | ............ | B60N 2/22 |
| | | | | 297/354.1 |
| 2014/0375106 A1* | 12/2014 | Yamada | ............ | B60N 2/682 |
| | | | | 297/452.18 |

* cited by examiner

RECLINER ATTACHMENT BRACKET

INCORPORATION BY REFERENCE

The disclosure of Japanese Patent Application No. 2015-105502 filed on May 25, 2015 including the specification, drawings and abstract is incorporated herein by reference in its entirety.

BACKGROUND OF THE INVENTION

1. Field of the Invention

The present invention relates to an occupant sitting seat to be provided in vehicles such as an automobile, an airplane, a ship, and a train, and particularly to a recliner attachment bracket.

2. Description of Related Art

In regard to an automobile seat, such a technique has been developed that a closed-section structural material is used in a side frame in a back frame of a seatback in order to achieve weight reduction while securing a necessary strength (see Japanese Patent Application Publication No. 2013-193586 (JP 2013-193586 A)). In the back frame, in order to attach a recliner, a bracket is fixed to a lower end of the side frame made of the closed-section structural material.

SUMMARY OF THE INVENTION

However, the bracket for attaching the recliner should have a high strength functionally, so that its weight is large, which acts as an impediment to weight reduction of the seat.

The present invention provides a recliner attachment bracket provided in a lower end of a side frame constituted by a closed-section structural material, and the recliner attachment bracket is able to achieve weight reduction while securing a necessary strength as a bracket, by combining plate materials forming a closed-section structure according to necessary strengths of respective parts within the bracket.

A recliner attachment bracket according to an aspect of the present invention is provided in a lower end of a side frame constituted by a closed-section structural material, and includes a closed-section structural material having a recliner attachment portion. The recliner attachment portion is configured such that surfaces of two plate materials are joined to each other by pressing a central part of the closed-section structural material while hollow closed-section structures are left on both sides of the closed-section structural material. A lower end of the recliner attachment portion is constituted by only one of the plate materials.

In the above aspect, the recliner attachment bracket may be formed integrally with the side frame, or may be formed separately from the side frame and then integrally coupled with each other. Further, the closed-section structural material may be formed integrally by extrusion molding, or one plate material may be joined in an annular shape. Further, a recliner may be attached to either of a front surface and a back surface of the recliner attachment portion formed by pressing the closed-section structure.

According to the above aspect, in the recliner attachment bracket, a hollow closed-section structure, a structure in which the surfaces of two plate materials are joined to each other, and a structure with only one plate material are formed sequentially from a part that should have a strength. Accordingly, by appropriately combining the plate materials forming the closed-section structure, it is possible to secure a necessary strength as the bracket and to achieve weight reduction.

In the above aspect, the recliner attachment portion may be configured such that the plate materials the surfaces of which are joined to each other are coupled with each other so as not to be separated away in an overlapping direction.

In the above configuration, as a coupling method, various methods such as welding, adhesion, and mechanical coupling may be employed.

According to the above configuration, since two plate materials are coupled with each other, it is possible to prevent the two plate materials from being separated away and to increase the strength of the recliner attachment portion.

In the above aspect, the lower end of the recliner attachment portion may be formed as a flange portion such that the lower end is bent to project in the same direction as the hollow closed-section structures on both sides, the hollow closed-section structures being projecting from a recliner attachment surface of the recliner attachment portion.

According to the above configuration, since the lower end of the recliner attachment portion is formed as a bent flange portion, the flange portion forms a rib structure, thereby making it possible to reinforce the lower end of the recliner attachment portion.

In the above aspect, a fitting hole configured to receive an attachment projection formed in a recliner may be formed in the recliner attachment portion, the fitting hole may consist of a first fitting hole and a second fitting hole, the fitting hole may pass through the recliner attachment portion, the first fitting hole may be formed in one of the two plate materials, the second fitting hole may be formed in the other one of the two plate materials, the first fitting hole may have a larger area around the attachment projection than that of the second fitting hole, and the one of the two plate materials may be placed on a side farther from the recliner than the other one of the two plate materials.

According to the above configuration, a fitting hole on a distal end side of the attachment projection of the recliner has a larger area. Accordingly, in a case where a height of the attachment projection of the recliner is smaller than a total thickness of the two plate materials the surfaces of which are joined to each other, it is possible to omit a plate material surrounding the distal end side of the attachment projections. Accordingly, at the time when the attachment projection is welded to the recliner attachment portion so as to attach the recliner to the recliner attachment portion, it is possible to increase a welding strength by largely securing a space to receive a solvent around the attachment projection.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
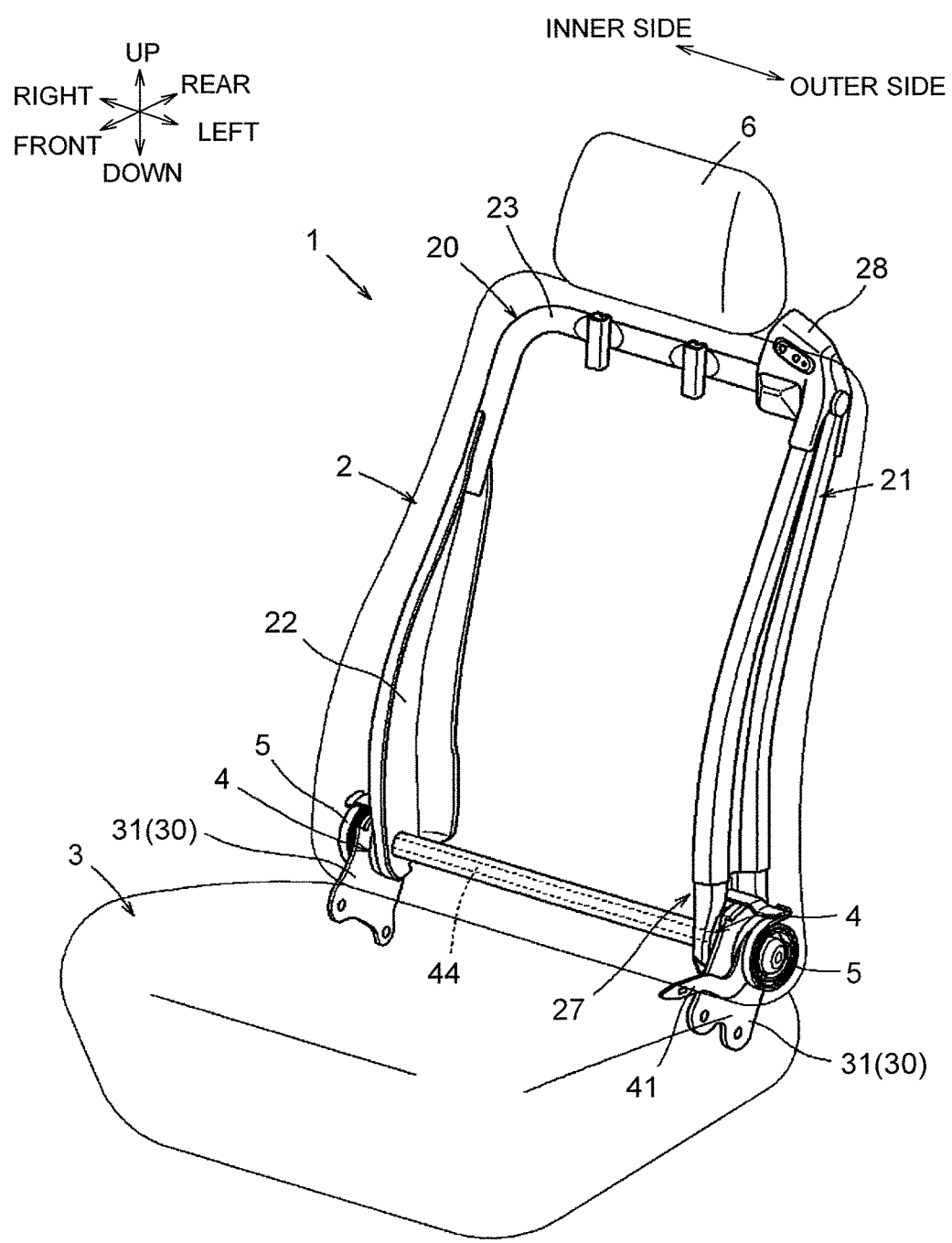
FIG. 1 is a perspective view of an automobile seat to which a first embodiment of the present invention is applied.
Figure 2:
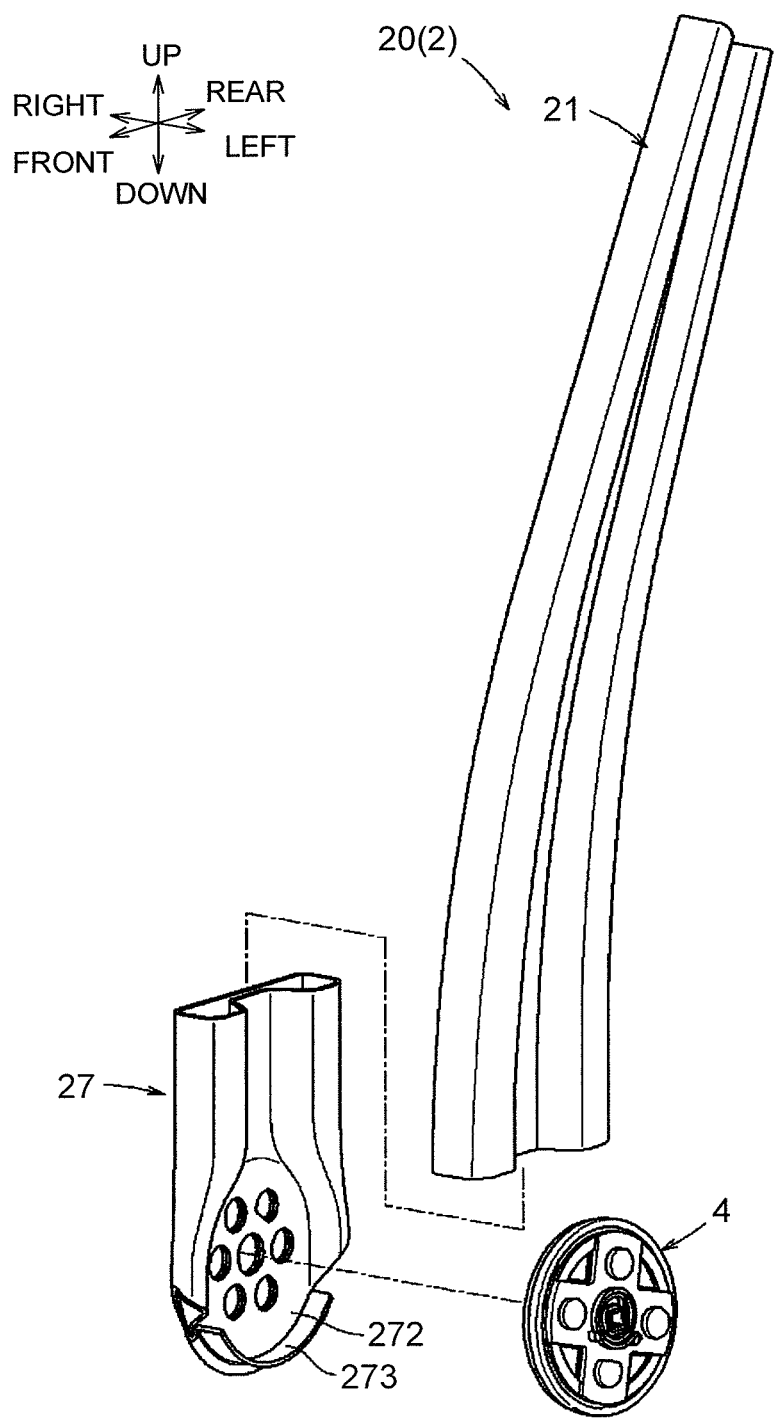
FIG. 2 is an enlarged exploded perspective view of a side frame portion in the automobile seat.

FIG. 1 illustrates an automobile seat (hereinafter just referred to as the seat) 1 to which a recliner attachment bracket (hereinafter just referred to as the bracket) 27 according to a first embodiment of the present invention is applied. Further, FIG. 2 illustrates a side frame 21 and so on constituted by a closed-section structural material in an enlarged manner. In FIGS. 1, 2, an arrow indicates a direction in a state where the seat 1 is provided in an automobile. In the following description, a description related to a direction shall be made on the basis of this direction.

The seat 1 is configured such that a seatback 2 that supports a back of a sitting occupant from a rear side is assembled to a seat cushion 3 that supports a weight of the sitting occupant, and a headrest 6 that supports a head of the sitting occupant from the rear side is attached to a top of the seatback 2. In this case, an angle of the seatback 2 is adjustable relative to the seat cushion 3 in a front-rear direction.

In FIG. 1, a detailed configuration of a back frame 20 of the seatback 2 is illustrated. The back frame 20 is configured such that an upper part of an outer side frame 21 in a vehicle is connected, by an upper frame 23, to an inner side frame 22 in the vehicle. The seat 1 in this case has a configuration in which a seat belt (not shown) is incorporated into the seat 1, and the upper part of the outer side frame 21 in the vehicle is provided with a belt drawing outlet 28 via which the seat belt is drawn outside from a shoulder of the seatback 2. Since the seat 1 is configured such that the seat belt is incorporated therein as such, it is necessary that a strength of the back frame 20 be increased in comparison with a seat in which a seat belt is not incorporated. In view of this, the side frame 21 provided with the belt drawing outlet 28 is constituted by a closed-section structural material with an increased strength.

A lower end of the side frame 21 is provided with a bracket 27 for attaching a recliner 4 thereto, and the recliner 4 is fixed between a lower arm 31 of a cushion frame 30 and the bracket 27. In the meantime, a recliner 4 is also attached between a lower end of the side frame 22 and a lower arm 31 of the cushion frame 30. When the recliners 4 are unlocked by pivoting an operating lever 41, the recliners 4 can adjust the angle of the seatback 2 relative to the seat cushion 3 to a given angle. The recliners 4 on right and left sides are connected by a connecting rod 44, and an unlock operation on the recliners 4 on both sides is performed at the same time by operating one operating lever 41.

As well known, a spiral spring 5 is provided between the side frame 21 and the lower arm 31 and between the side frame 22 and the lower arm 31, so as to bias the seatback 2 to tilt forward.

In FIG. 2, the side frame 21, the bracket 27, and the recliner 4 are extracted to be illustrated in an enlarged manner. As is apparent from this, the bracket 27 is configured to be inserted into the lower end of the side frame 21 and fixed thereto, and the bracket 27 is constituted by a closed-section structural material, similarly to the side frame 21. In a state where the bracket 27 is inserted into the side frame 21, they are integrated by welding, adhesion, or riveting. Then, the recliner 4 is welded and fixed to the bracket 27. In this case, the side frame 21 is formed by extrusion molding of aluminum, and the bracket 27 is formed by press working of a steel plate. Accordingly, it is not necessary to perform special welding on the recliner 4 as an iron product with respect to the bracket 27, thereby making it possible to manufacture them with a low cost.

Figure 3:
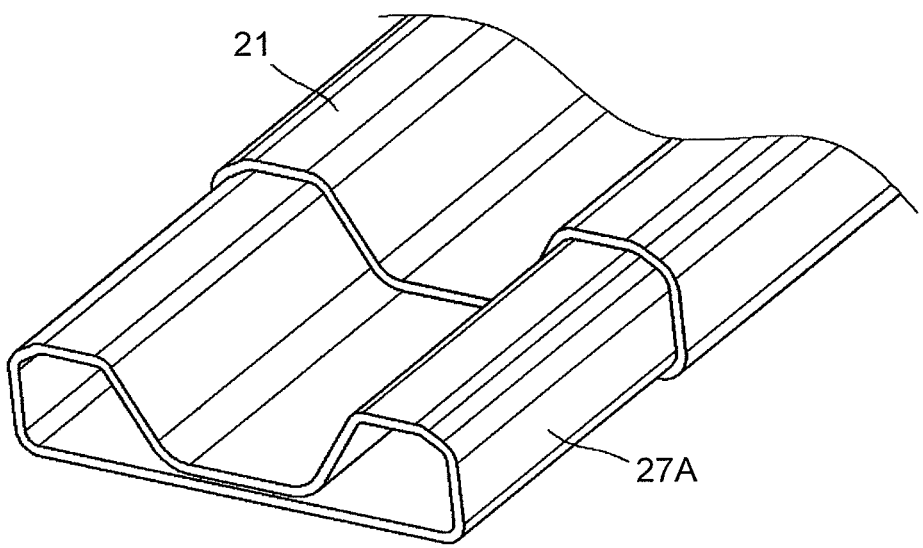
FIG. 3 is an enlarged perspective view illustrating a manufacturing process of the side frame portion.
Figure 4:
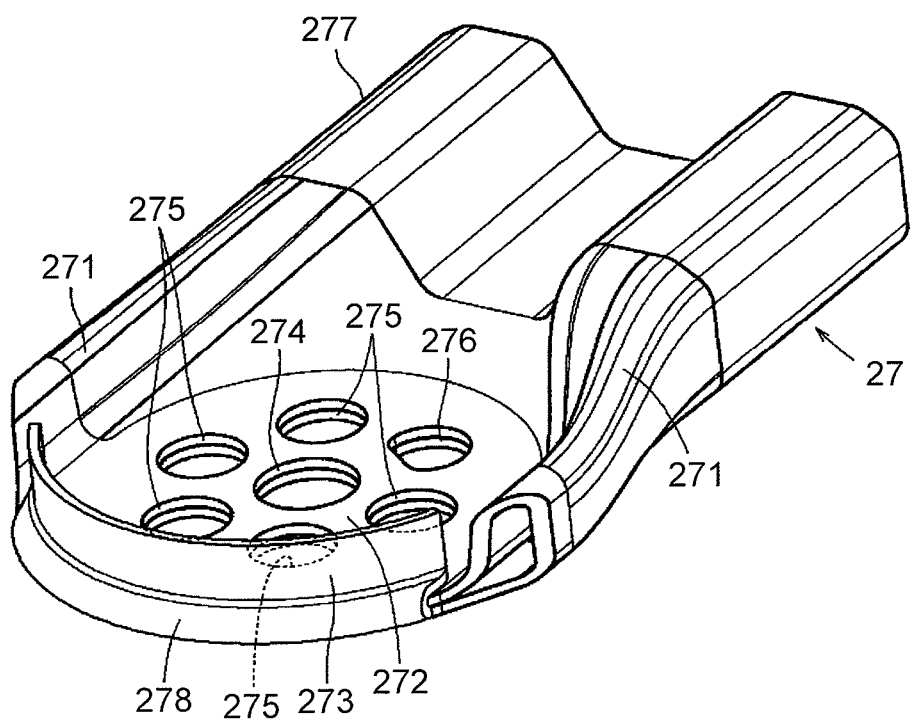
FIG. 4 is an enlarged perspective view of a recliner attachment bracket according to the first embodiment.
Figure 5:
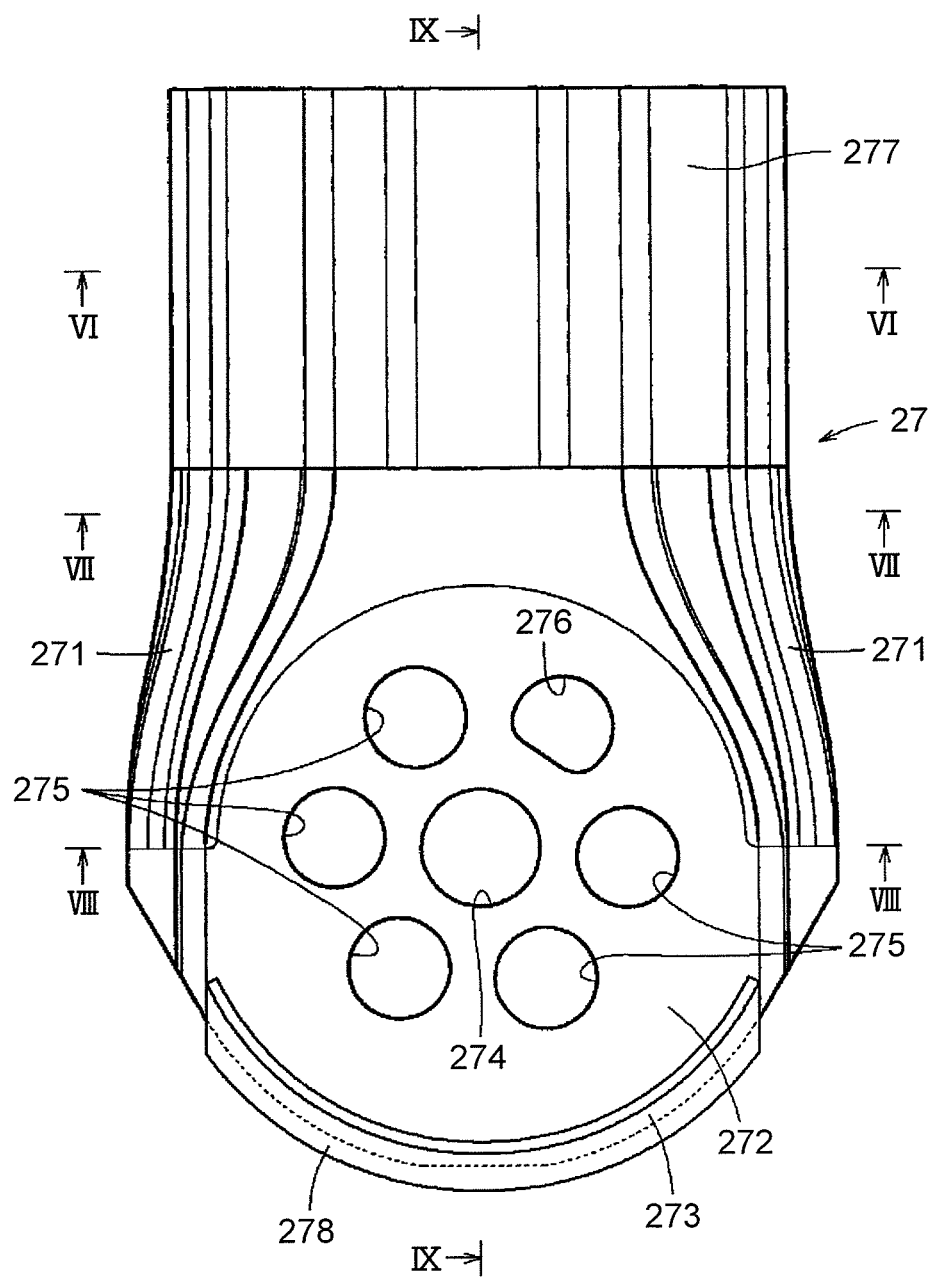
FIG. 5 is a front view of the recliner attachment bracket of FIG. 4.
Figure 6:
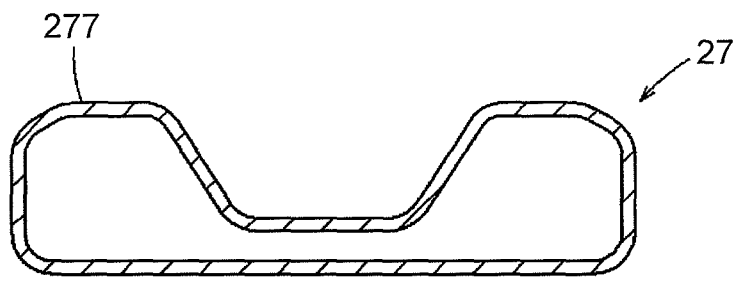
FIG. 6 is a sectional view taken along an arrow VI-VI in FIG. 5.
Figure 7:
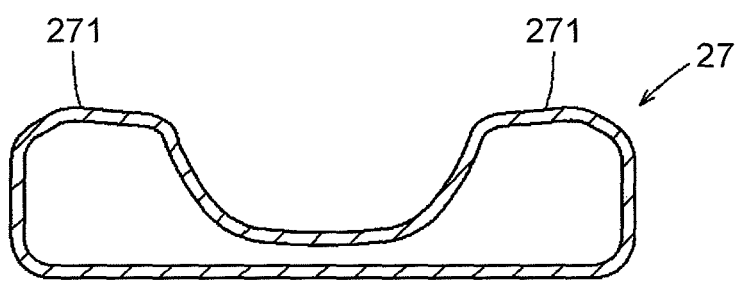
FIG. 7 is a sectional view taken along an arrow VII-VII in FIG. 5.
Figure 8:
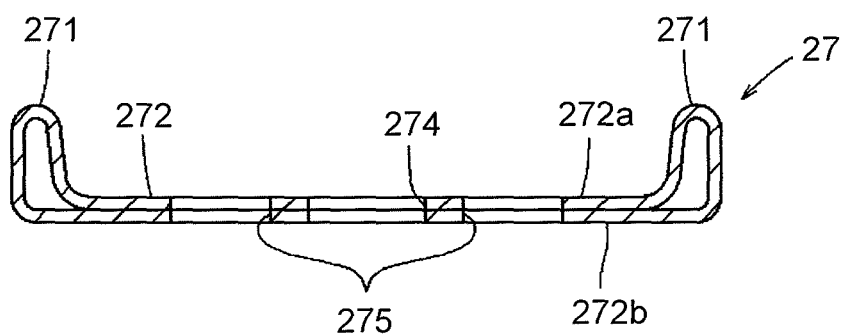
FIG. 8 is a sectional view taken along an arrow VIII-VIII in FIG. 5.

FIG. 3 illustrates a state where a closed-section structural material 27A to be formed into the bracket 27 is inserted into the side frame 21. Press working is performed on the closed-section structural material 27A in this state, so as to form the bracket 27. Note that, after press working is performed on the closed-section structural material 27A to form the bracket 27, the bracket 27 thus formed may be inserted into the side frame 21 so as to be integrated therewith.

FIGS. 4 to 9 illustrate only the bracket 27 after the press working. Except for a part serving as an insertion portion 277 into the lower end of the side frame 21, the bracket 27 is configured such that a central part thereof is pressed by press working such that surfaces of two plate materials are joined to each other, while hollow closed-section structural portions 271 are left on both sides. Parts of the bracket 27 on both sides serve as end portions in the front-rear direction at the time when the bracket 27 is inserted into the side frame 21 and fixed thereto, and the central part serves as a recliner attachment portion 272 in which a plane on which to fix the recliner 4 is formed.

The closed-section structural portions 271 on both sides of the recliner attachment portion 272 are machined to expand toward both sides with their projection height being gradually decreased from a side closer to the insertion portion 277 toward a lower end side. Since both sides of the recliner attachment portion 272 are formed to expand larger than a width of the insertion portion 277 as such, it is not necessary to increase a width of the whole bracket 27 in accordance with a size of the recliner 4, thereby making it possible to achieve downsizing and weight reduction of the bracket 27.

The recliner attachment portion 272 is provided with a hinge hole 274 through which a hinge shaft 42 (see FIG. 18) of the operating lever 41 penetrates, and fitting holes 275, 276 that receive attachment projection 43 (see FIG. 18) of the recliner 4. One hinge hole 274 is formed at a center of the recliner attachment portion 272, and six fitting holes 275, 276 in total are provided around the hinge hole 274. Five fitting holes 275 are formed in a round shape, and one fitting hole 276 is formed in a shape in which a round shape is partially cut off. This is for an attachment position of the recliner 4 to be always placed at a constant position. The holes 274, 275, 276 are formed at the same time as the press working so as to be formed in the same shape in two plate materials.

Figure 9:
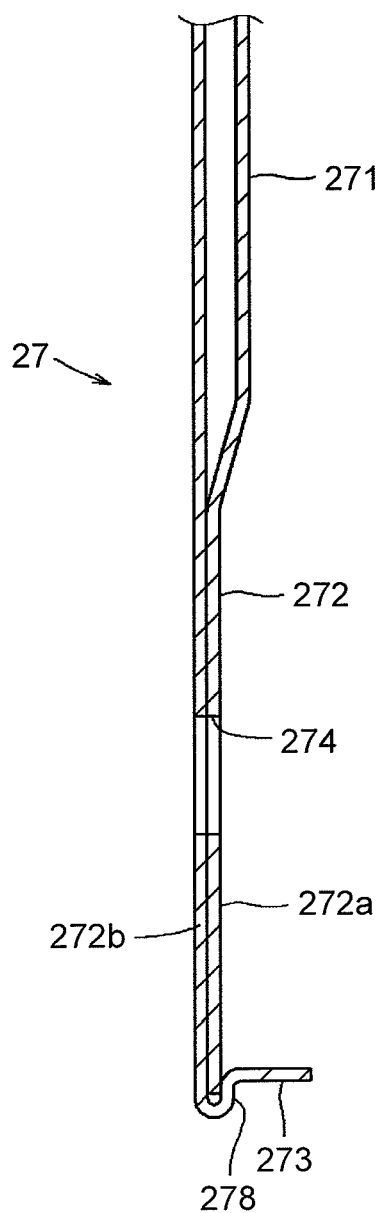
FIG. 9 is a sectional view taken along an arrow IX-IX in FIG. 5.

As well illustrated in FIG. 9, on a lower end side of the recliner attachment portion 272, a back-side portion 272b is extended downward longer than a front-side portion 272a. The back-side portion 272b is bent at a position corresponding to a distal end of the front-side portion 272a so as to form a coupling portion 278 such that the distal end of the front-side portion 272a is sandwiched between front and back sides of the back-side portion 272b. As such, the front-side portion 272a is coupled with the back-side portion 272b by the coupling portion 278. On a distal end side of the coupling portion 278, the back-side portion 272b is projected in the same direction as the closed-section structural portion 271 projecting from the recliner attachment portion 272, so that a flange portion 273 is formed. The closed-section structural portion 271 and the flange portion 273 are formed in an annular shape as a whole so as to surround the recliner attachment portion 272 (see FIGS. 4, 5).

As such, the hollow closed-section structural portion 271, the recliner attachment portion 272 having a structure in which surfaces of two plate materials are joined to each other, and the flange portion 273 constituted by only one plate material are formed in the bracket 27, sequentially from a part that should have a strength. That is, by appropriately combining the plate materials forming a closed-section structure by press working, it is possible to secure a necessary strength as the bracket 27 and achieve weight reduction. Besides, since the bracket 27 is configured such that the insertion portion 277 having the closed-section structure is inserted into the lower end of the side frame 21 and fixed thereto, the bracket 27 also serves as a function to restrain deformation of a section of the side frame 21. Accordingly, it is possible to eliminate the need to insert a collar or a pipe into the side frame 21 as a component for preventing the section deformation.

Further, since the front-side portion 272a and the back-side portion 272b of the recliner attachment portion 272 are coupled with each other by the coupling portion 278, it is possible to prevent the front-side portion 272a and the back-side portion 272b from being separated apart and to increase the strength of the recliner attachment portion 272. Further, since the back-side portion 272b is bent in the coupling portion 278, the coupling portion 278 and the flange portion 273 form a rib structure, thereby making it possible to reinforce the lower end of the recliner attachment portion 272.

Figure 10:
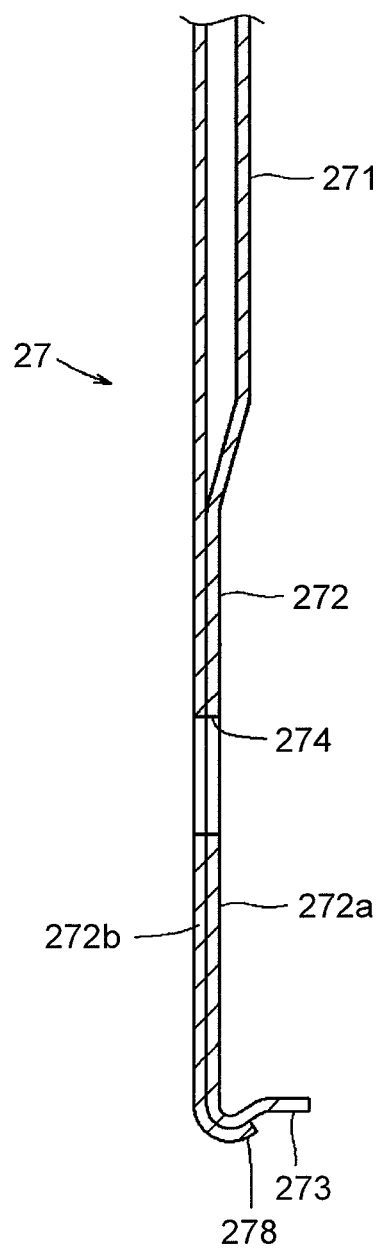
FIG. 10 is a sectional view according to a second embodiment of the present invention and corresponds to FIG. 9.

FIG. 10 illustrates a second embodiment of the present invention. A characteristic point of the second embodiment as compared to the first embodiment is that a structure of a coupling portion 278 is changed. The other points are the same in the first and second embodiments, so redundant descriptions of the same points are omitted.

In the second embodiment, a front-side portion 272a is extended downward longer than a back-side portion 272b in a recliner attachment portion 272 so as to be bent. A distal end of the front-side portion 272a is projected in the same direction as a closed-section structural portion 271 projecting from a recliner attachment portion 272, so that a flange portion 273 is formed. Further, a distal end of the back-side portion 272b is also bent along a bending portion of the front-side portion 272a so as to constitute the coupling portion 278 such that the bending portion of the front-side portion 272a is caulked by the distal end of the back-side portion 272b, and thus, the front-side portion 272a is coupled with the back-side portion 272b.

Since the front-side portion 272a and the back-side portion 272b of the recliner attachment portion 272 are coupled with each other by the coupling portion 278 as such, it is possible to prevent the front-side portion 272a and the back-side portion 272b from being separated away and to increase a strength of the recliner attachment portion 272.

Figure 11:
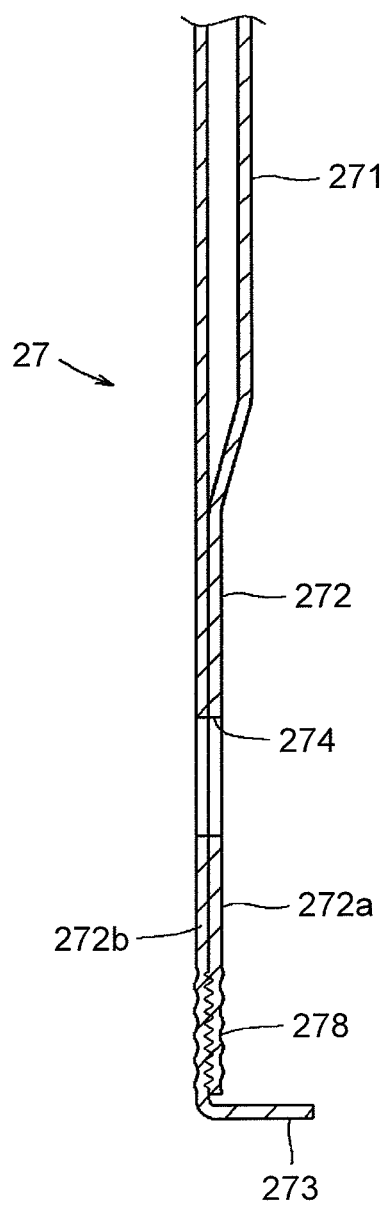
FIG. 11 is a sectional view according to a third embodiment of the present invention and corresponds to FIG. 9.

FIG. 11 illustrates a third embodiment of the present invention. A characteristic point of the third embodiment as compared to the first embodiment is that a structure of a coupling portion 278 is changed. The other points are the same in the first and third embodiments, so redundant descriptions of the same points are omitted.

In the third embodiment, a back-side portion 272b is extended downward longer than a front-side portion 272a in a recliner attachment portion 272 so as to be bent. A distal end of the back-side portion 272b is projected in the same direction as a closed-section structural portion 271 projecting from the recliner attachment portion 272, so that a flange portion 273 is formed. Further, a distal end of the front-side portion 272a is integrally coupled with the back-side portion 272b by spot welding so that the coupling portion 278 is formed. Since the front-side portion 272a and the back-side portion 272b of the recliner attachment portion 272 are coupled with each other by the coupling portion 278 as such, it is possible to increase a strength of the recliner attachment portion 272 similarly to the first embodiment and the second embodiment.

Figure 12:
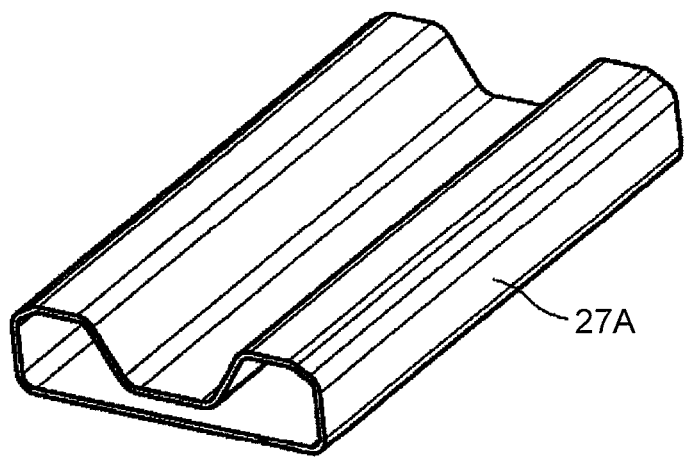
FIG. 12 is a perspective view illustrating a closed-section structural material before the recliner attachment bracket according to the first embodiment is machined.

FIG. 12 illustrates the closed-section structural material 27A to form the bracket 27 in the first embodiment. A shape of the closed-section structural material 27A is machined in advance into a shape that allows the closed-section structural material 27A to be inserted into the side frame 21.

Figure 13:
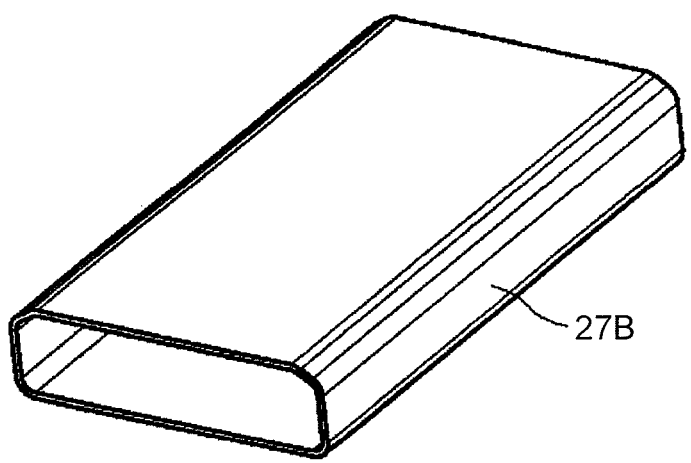
FIG. 13 is a perspective view illustrating a closed-section structural material before a recliner attachment bracket according to a fourth embodiment of the present invention is machined.
Figure 14:
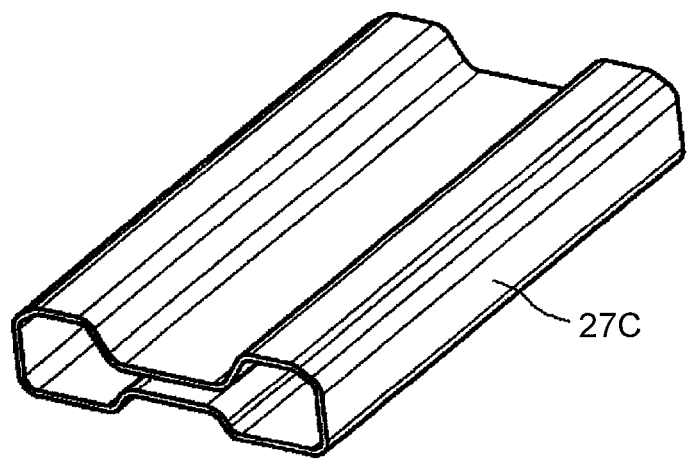
FIG. 14 is a perspective view illustrating a closed-section structural material before a recliner attachment bracket according to a fifth embodiment of the present invention is machined.

FIGS. 13, 14 illustrate fourth and fifth embodiments of the present invention. A characteristic point of the fourth and fifth embodiments as compared to the first embodiment is that a shape of a closed-section structural material to form a bracket 27 is changed. The other points are the same in the first embodiment and the fourth and fifth embodiments, so redundant descriptions of the same points are omitted.

A closed-section structural material 27B of the fourth embodiment is formed substantially in a square tubular shape. In this case, it is desirable that a shape of a side frame 21 have the same shape as the closed-section structural material 27B. Further, a closed-section structural material 27C of the fifth embodiment has a shape having a bead similar to the closed-section structural material 27A in the first embodiment, but the bead is formed on both front and back surfaces. Even in this case, it is desirable that a shape of a side frame 21 have the same shape as the closed-section structural material 27C.

Figure 15:
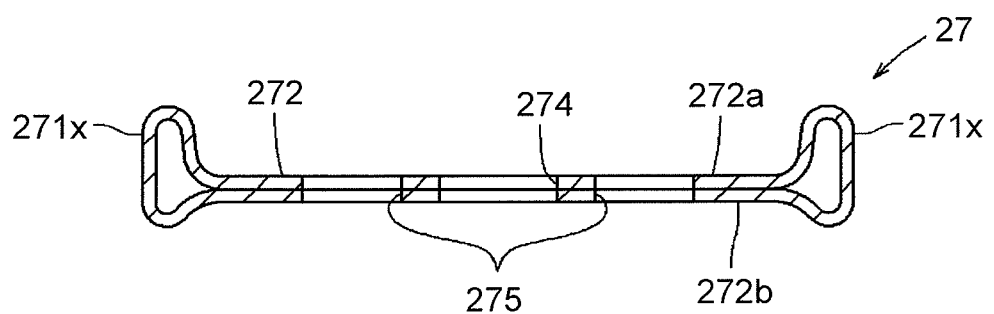
FIG. 15 is a sectional view according to the fifth embodiment and corresponds to FIG. 8.

FIG. 15 illustrates a bracket 27 formed by performing press working on the closed-section structural material 27C of the fifth embodiment. The bracket 27 in this case is formed in a shape in which closed-section structural portions 271*x* project on both front and back surfaces of a recliner attachment portion 272 by being affected by the shape of the closed-section structural material 27C at the time when the recliner attachment portion 272 is formed by pressing a central part of the bracket 27 while the hollow closed-section structural portions 271*x* are left on both sides of the bracket 27. When the bracket 27 is formed in such a shape, a drawing degree of a material at the time of forming the recliner attachment portion 272 by pressing the closed-section structural material becomes smaller than that of the first embodiment, thereby making it possible to lower a degree of difficulty of the drawing. Further, since a height of the closed-section structural portions 271*x* projecting on an attachment surface side of a recliner 4 is lower than a height of the closed-section structural portions 271 in the first embodiment, attachment workability at the time of attaching the recliner 4 to the recliner attachment portion 272 can be improved. Further, at the time when a lower arm 31 (see FIG. 1) placed across the recliner 4 rotates relative to the bracket 27, it is possible to restrain such a possibility that the lower arm 31 interferes with the closed-section structural portions 271*x*.

Figure 16:
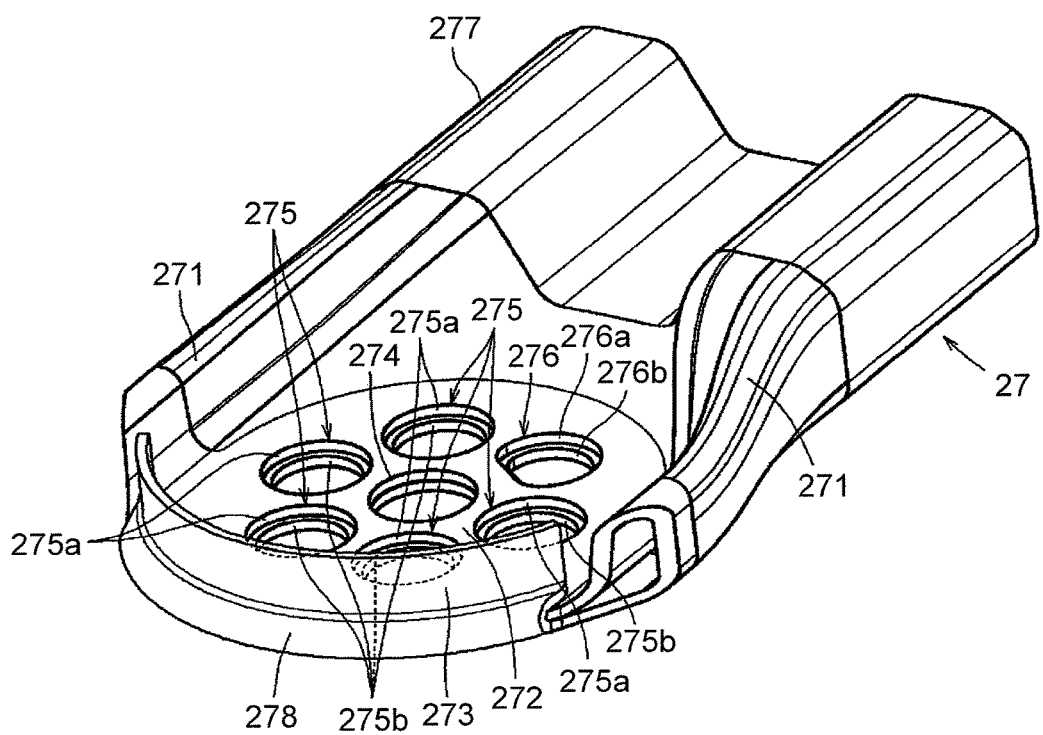
FIG. 16 is a perspective view of a recliner attachment bracket according to a sixth embodiment of the present invention and corresponds to FIG. 4.
Figure 17:
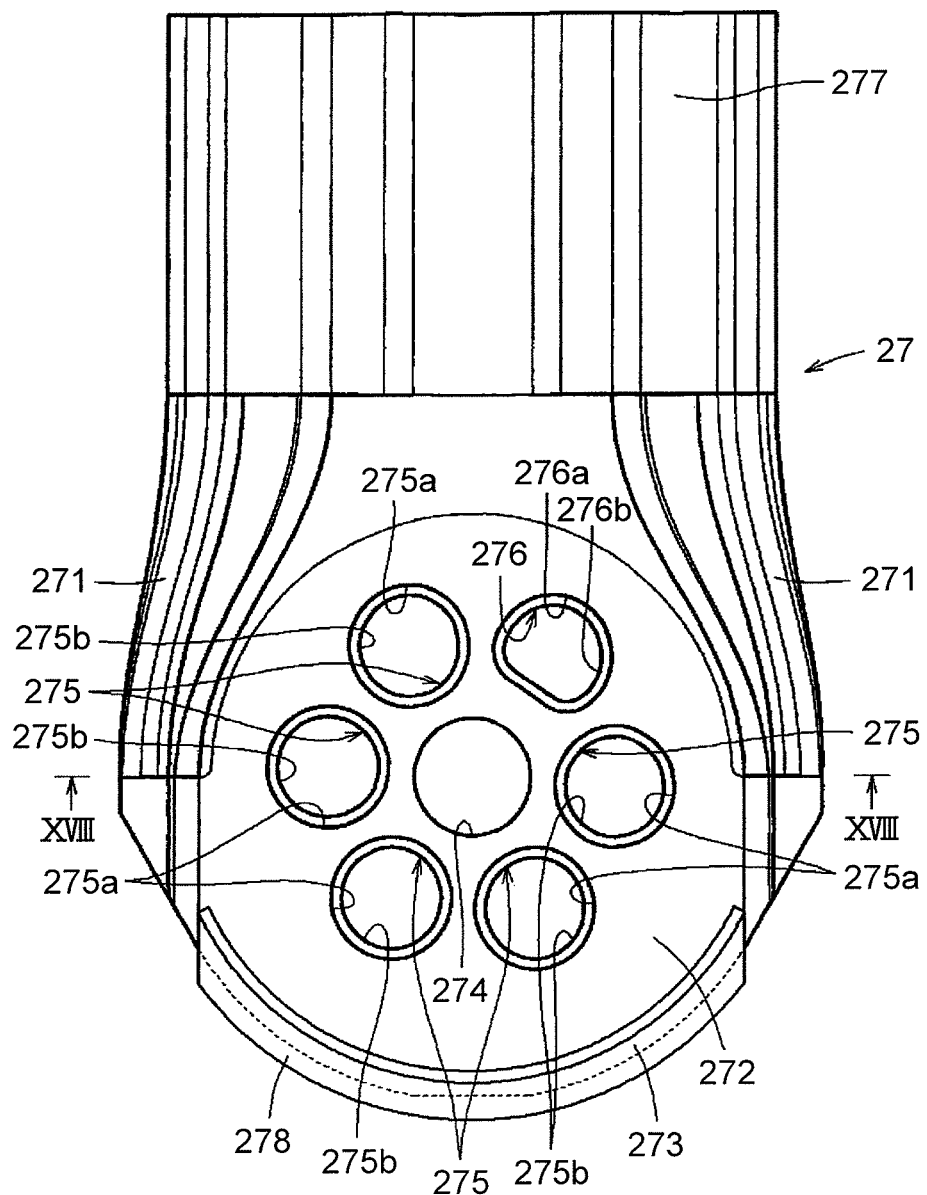
FIG. 17 is a front view of the recliner attachment bracket of FIG. 16.
Figure 18:
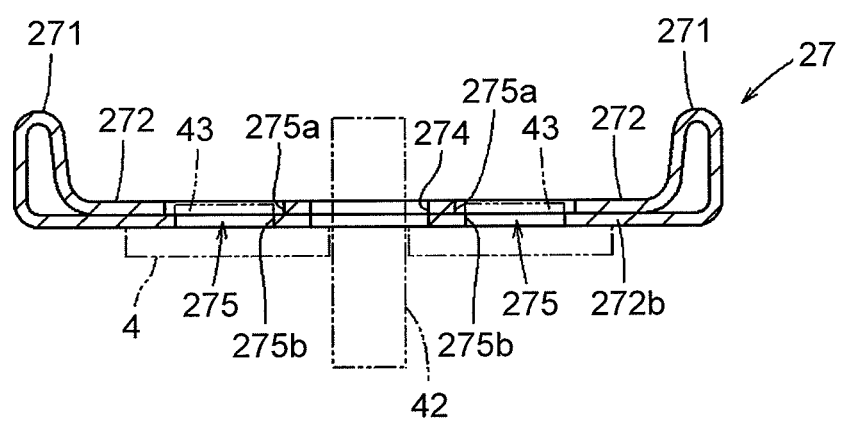
FIG. 18 is a sectional view taken along an arrow XVIII-XVIII in FIG. 17.

FIGS. 16 to 18 illustrate a sixth embodiment of the present invention. Characteristic points of the sixth embodiment as compared to the first embodiment are that shapes of fitting holes 275, 276 are changed and that an attachment surface of a recliner 4 to a recliner attachment portion 272 is formed on an opposite side to that of the first embodiment. The other points are the same in the first and sixth embodiments, so redundant descriptions of the same points are omitted.

In the sixth embodiment, the fitting holes 275, 276 formed in the recliner attachment portion 272 are configured such that back-side fitting holes 275*b*, 276*b* formed on a back-side portion 272*b* have diameters smaller than those of front-side fitting holes 275*a*, 276*a* formed on a front-side portion 272*a*. Accordingly, due to the difference in diameter between the front-side fitting holes 275*a*, 276*a* and the back-side fitting holes 275*b*, 276*b*, inner sides of the fitting holes 275, 276 are formed in a stepped shape.

In the sixth embodiment, as well illustrated in FIG. 18, the recliner 4 is attached to the back-side portion 272*b* of the recliner attachment portion 272. Accordingly, when attachment projections 43 of the recliner 4 are inserted into the fitting holes 275, 276, gaps are formed around distal ends of the attachment projections 43 with respect to edge portions of the front-side fitting holes 275*a*, 276*a*. As a result, at the time when the attachment projections 43 are welded to the recliner attachment portion 272, it is possible to increase a welding strength by largely securing spaces to receive a solvent around the attachment projections 43. In this case, a height of the attachment projections 43 is smaller than a total thickness of two plate materials the surfaces of which are joined to each other, but diameters of the front-side fitting holes 275*a*, 276*a* are larger than a diameter of the attachment projections 43, and hereby, spaces to receive the solvent can be secured around the attachment projections 43.

Figure 19:
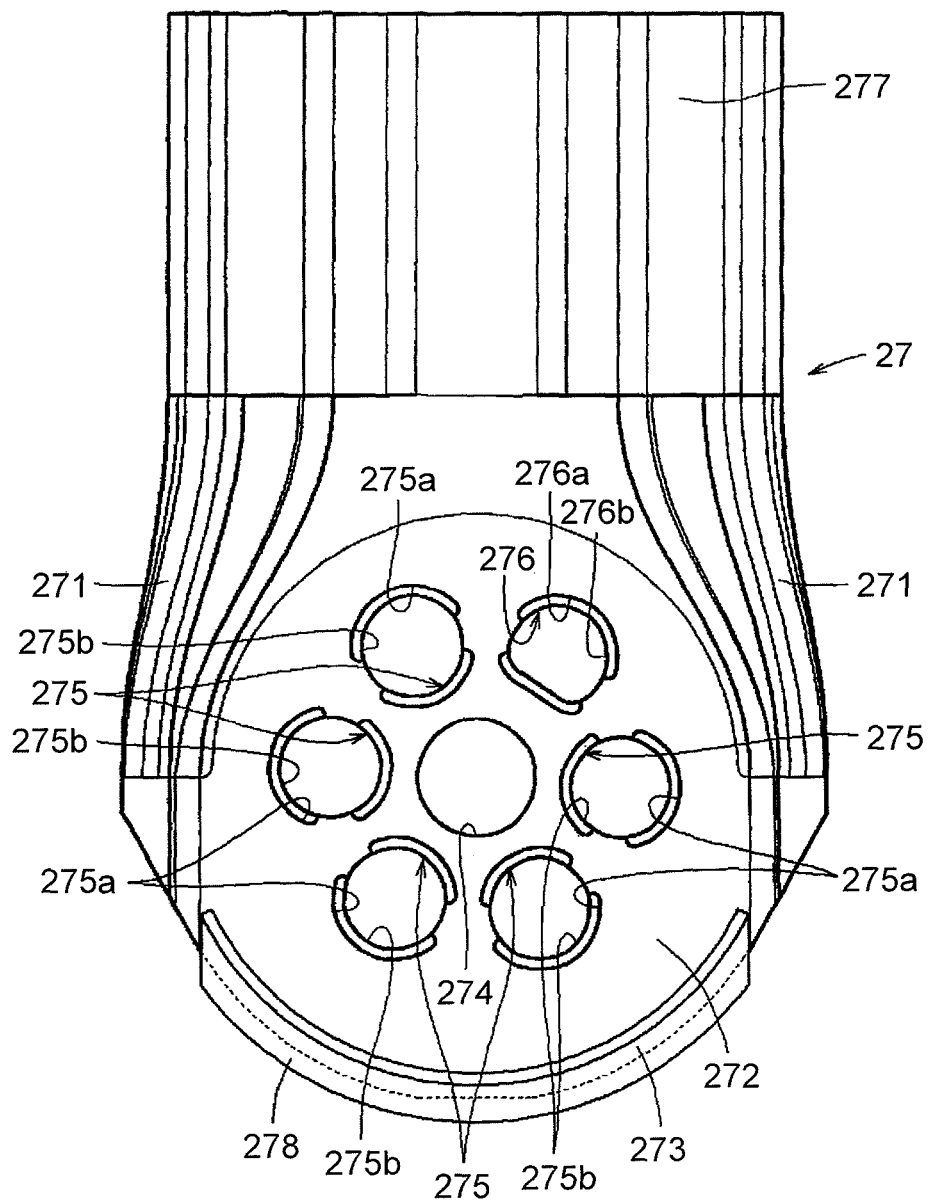
FIG. 19 is a front view of a recliner attachment bracket according to a seventh embodiment of the present invention and corresponds to FIG. 5.

FIG. 19 illustrates a seventh embodiment of the present invention. A characteristic point of the seventh embodiment as compared to the sixth embodiment is that shapes of fitting holes 275, 276 are changed. The other points are the same in the sixth and seventh embodiments, so redundant descriptions of the same points are omitted.

In the seventh embodiment, an inside diameter of a front-side fitting hole 275*a*, 276*a* is partially reduced at two places, so as to become equal to a diameter of a back-side fitting hole 275*b*, 276*b*. Two small diameter portions formed as such are placed at positions on a concentric circle to a hinge hole 274, the concentric circle passing through a center of a circle of the front-side fitting hole 275*a*, 276*a*.

A transmission of a force between a recliner 4 and a bracket 27 in a rotation direction of the recliner 4 is performed such that an attachment projection 43 of the recliner 4 engages with a corresponding fitting hole 275, 276 on the concentric circle to the hinge hole 274. According to the seventh embodiment, the attachment projection 43 of the recliner 4, fitted to the fitting hole 275, 276, engages with an inner edge of the back-side fitting hole 275*b*, 276*b* and inner edges of the two small diameter portions of the front-side fitting hole 275*a*, 276*a* in a force transmission direction. Accordingly, a solvent for welding does not enter a force transmission path, thereby making it possible to transmit a large force.

Specific embodiments have been described above, but the invention is not limited to the appearances and the configurations described in the above embodiments, and various modifications, additions, and deletions are performable as far as they do not change a gist of the invention. For example, in each of the embodiments, the side frame 21 is formed by extrusion molding of aluminum and the bracket 27 is formed by press working of a steel plate. However, the side frame 21 and the bracket 27 may be both formed of extrusion molding products of aluminum or press working products of a steel plate. Alternatively, they may be formed by use of a closed-section structural material except for aluminum and iron. Further, in each of the above embodiments, the flange portion 273 is provided in the lower end of the bracket 27, but the flange portion 273 may not be provided, and two plate materials the surfaces of which are joined to each other are cut at the lower end of the recliner attachment portion 272. At this time, the two plate materials may be coupled with each other or may not be coupled with each other. Further, in each of the above embodiments, the present invention is applied to a seat for an automobile, but may be applied to seats to be provided in an airplane, a ship, a train, and the like.

What is claimed is:

1. A recliner attachment bracket provided in a lower end of a side frame, the lower end of the side frame having a first closed-section structural material, the recliner attachment bracket comprising:
   a second closed-section structural material comprising two sides formed from two plate portions, and having a recliner attachment portion, wherein:
   the recliner attachment portion is configured such that surfaces of the two plate portions are joined to each other at a central part of the second closed-section structural material while hollow closed-section structures remain on both sides of the central part of the second closed-section structural material; and
   a lower end of the recliner attachment portion is formed by only one of the two plate portions.

2. The recliner attachment bracket according to claim 1, wherein:
   the recliner attachment portion is configured such that the two plate portions, the surfaces of which are joined to each other are coupled with each other so as not to be separated away in an overlapping direction.

3. The recliner attachment bracket according to claim 1, wherein:
   the recliner attachment portion comprises a recliner attachment surface, and the lower end of the recliner attachment portion is formed as a flange portion such that the lower end is bent to project in the same direction as the hollow closed-section structures on both sides, the hollow closed-section structures projecting from the recliner attachment surface.

4. The recliner attachment bracket according to claim 1, wherein:

the recliner attachment portion includes at least one fitting hole configured to receive an attachment projection formed in a recliner;

the at least one fitting hole passes through the recliner attachment portion;

the at least one fitting hole comprises a first fitting hole formed in one of the two plate portions, and a second fitting hole formed in the other one of the two plate portions;

the first fitting hole has a larger area than that of the second fitting hole; and the one of the two plate portions is placed on a side farther from the recliner than the other one of the two plate portions.

\* \* \* \* \*